(12) United States Patent
Pala et al.

(10) Patent No.: US 11,956,354 B2
(45) Date of Patent: *Apr. 9, 2024

(54) SYSTEMS AND METHODS FOR ENHANCED INTERNET OF THINGS DIGITAL CERTIFICATE SECURITY

(71) Applicant: CABLE TELEVISION LABORATORIES, INC., Louisville, CO (US)

(72) Inventors: Massimiliano Pala, Denver, CO (US); Ronald H. Ih, Los Altos, CA (US)

(73) Assignee: Cable Television Laboratories, Inc., Louisville, CO (US)

( * ) Notice: Subject to any disclaimer, the term of this patent is extended or adjusted under 35 U.S.C. 154(b) by 24 days.

This patent is subject to a terminal disclaimer.

(21) Appl. No.: 17/706,067

(22) Filed: Mar. 28, 2022

(65) Prior Publication Data

US 2022/0216992 A1 Jul. 7, 2022

Related U.S. Application Data

(63) Continuation of application No. 16/551,392, filed on Aug. 26, 2019, now Pat. No. 11,290,270.

(60) Provisional application No. 62/750,421, filed on Oct. 25, 2018, provisional application No. 62/722,502, filed on Aug. 24, 2018.

(51) Int. Cl.
*H04L 9/40* (2022.01)
*H04L 9/08* (2006.01)
*H04L 9/32* (2006.01)

(52) U.S. Cl.
CPC .......... *H04L 9/0891* (2013.01); *H04L 9/3247* (2013.01); *H04L 9/3268* (2013.01)

(58) Field of Classification Search
CPC .... H04L 9/0891; H04L 9/3247; H04L 9/3268
See application file for complete search history.

(56) References Cited

U.S. PATENT DOCUMENTS

| | | | | |
|---|---|---|---|---|
| 10,547,457 | B1 * | 1/2020 | Duccini | H04L 63/06 |
| 11,032,265 | B2 * | 6/2021 | Klieman | G06Q 30/0258 |
| 2004/0117666 | A1 * | 6/2004 | Lavender | H04L 61/4552 |
| | | | | 713/168 |
| 2004/0199469 | A1 * | 10/2004 | Barillova | G06Q 20/04 |
| | | | | 705/44 |
| 2005/0120205 | A1 * | 6/2005 | Umezawa | H04L 9/3263 |
| | | | | 713/156 |
| 2007/0058815 | A1 * | 3/2007 | Kwak | H04L 9/0841 |
| | | | | 380/286 |

(Continued)

*Primary Examiner* — Ghodrat Jamshidi
(74) *Attorney, Agent, or Firm* — Armstrong Teasdale LLP

(57) ABSTRACT

A system for enhanced internet of things digital certificate security is provided. The system includes a computer device. The computer device is programmed to store, in a database, a plurality of statuses associated with a plurality of digital certificates. The computer device is also programmed to receive, from a first computer device, a status update for the first digital certificate. The computer device is further programmed to update the first status based on the status update. Subsequently to updating the first status, the computer device is programmed to receive a request for a connection from the first device. Subsequently to updating the first status, the computer device is also programmed to deny the request for a connection based on the first status.

20 Claims, 6 Drawing Sheets

(56) References Cited

U.S. PATENT DOCUMENTS

| | | | |
|---|---|---|---|
| 2011/0004763 A1* | 1/2011 | Sato | H04L 63/0823 |
| | | | 713/175 |
| 2012/0210124 A1* | 8/2012 | Lieber | H04L 9/3263 |
| | | | 713/158 |
| 2018/0241739 A1* | 8/2018 | Takazoe | G06F 21/44 |
| 2018/0248705 A1* | 8/2018 | Schexnaydre | H04L 63/0823 |
| 2020/0021575 A1* | 1/2020 | Rezvani | H04L 63/20 |

* cited by examiner

SYSTEMS AND METHODS FOR ENHANCED INTERNET OF THINGS DIGITAL CERTIFICATE SECURITY

CROSS REFERENCE TO RELATED APPLICATIONS

This application is a continuation of U.S. patent application Ser. No. 16/551,392, filed Aug. 26, 2019, which claims the benefit of and priority to U.S. Provisional Patent Application No. 62/750,421, filed Oct. 25, 2018, entitled "REVOCATION SYSTEM FOR CLOUD IoT PROVIDERS," and the benefit of and priority to U.S. Provisional Patent Application No. 62/722,502, filed Aug. 24, 2018, entitled "REVOCATION SYSTEM FOR CLOUD IoT PROVIDERS," the entire contents and disclosures of which are incorporated by reference in their entirety.

BACKGROUND

The field of the disclosure relates generally to enhanced Internet of Things (IoT) digital certificate security, and more particularly, to systems and methods for automatically updating certificate revocation status for IoT cloud services.

Many conventional electronic devices utilize digital certificates, such as X.509 certificates to establish trust between devices. The digital certificates are tied to the identity of a person or legal entity, typically through a trusted Certificate Authority (CA). Overtime the digital certificates may need to be revoked for a variety of reasons, such as, the encryption keys associated with the certificate have been compromised, there are errors within an issued certificate, there is a change in usage of the certificate, or the certificate owner is no longer deemed to be trusted. There are two methods of revocation a Certificate Revocation List (CRL) and the Online Certificate Status Protocol (OCSP). The CRL is a list of revoked certificates (by serial number) that have been issued and then subsequently revoked by a given CA. CRLs are generally published on a periodic interval or can be published only when a certificate is revoked by the CA.

The Online Certificate Status Protocol (OCSP) was originally introduced to overcome the limitations of certificates revocation checking related to the use of CRLs. With the deployment of high-frequency and high-volume infrastructures for authentication and authorization, the best practices deployment of the OCSP protocol include the use of large deployment infrastructures and the periodic pre-generation of large quantities of responses to address the ever increasing number of requests.

In some situations, a user computer device receives a certificate, such as an X.509 certificate, through a web browser and needs to verify the information related to the revocation status of the certificate. To proceed, the user computer device looks up the server where the information relating to the revocation status may be found. In some embodiments, this is done by using one or more URLs embedded in the certificate or by using locally configured options. In some cases, the transport protocol, such as raw TCP, requires the submission of an OCSP request to determine the status of the certificate. In these situations, the user computer device generates the OCSP request and transmits the query to an OCSP responder. The OCSP responder responds with an OCSP response that includes information about the revocation status of the certificate.

However, both of these solutions include issues of scalability when dealing with IoT devices and were initially designed at a time that infrastructure for supporting billions of new devices had not been envisioned. Furthermore, the public key infrastructure ("PKI") was originally conceived for a server and datacenter infrastructure with several assumptions on the available computing power, memory, and storage capacity. Accordingly many of the assumptions do not match up with the realities of the IoT infrastructure as many of the IoT devices have small CPUs, small memory capacity, small storage capacity, might not be constantly connected to the network, and generally utilize a centralized connection service (such a as a cloud service). Furthermore, for IoT devise, the number of revocations could be potentially very large, as there may be a significant number of IoT devices associated with a single certificate. Accordingly, there is a need for an improved system for managing these certificates.

SUMMARY

In an embodiment, a system for enhanced internet of things digital certificate security is provided. The system includes a computer device including at least one processor in communication with at least one memory device. The at least one memory device stores a plurality of instructions. When executed by the at least one processor the instructions cause the at least one processor to store, in a database, a plurality of statuses associated with a plurality of digital certificates, including a first status of the plurality of statuses associated with a first digital certificate of the plurality of digital certificates. The first digital certificate is associated with a first device. The instructions also cause the at least one processor to receive, from a first computer device, a status update for the first digital certificate. The status update includes at least one of a revocation and a suspension of the first digital certificate. The instructions further cause the at least one processor to update the first status based on the status update. Subsequently to updating the first status, the instructions cause the at least one processor to receive a request for a connection from the first device. Subsequently to updating the first status, the instructions further cause the at least one processor to deny the request for a connection based on the first status In another embodiment, a method for enhanced internet of things digital certificate security is provided. The method includes storing, in a database, a plurality of statuses associated with a plurality of digital certificates, including a first status of the plurality of statuses associated with a first digital certificate of the plurality of digital certificates. The first digital certificate is associated with a first device. The method also includes receiving, from a first computer device, a status update for the first digital certificate. The status update includes at least one of a revocation and a suspension of the first digital certificate. The method further includes updating the first status based on the status update. Subsequently to updating the first status, the method includes receiving a request for a connection from the first device. Subsequently to updating the first status, the method also includes denying the request for a connection based on the first status.

In yet another embodiment, a system for enhanced internet of things digital certificate security is provided. The system includes a computer device including at least one processor in communication with at least one memory device. The at least one memory device stores a plurality of instructions. When executed by the at least one processor the instruction cause the at least one processor to store, in a database, a plurality of statuses associated with a plurality of digital certificates, including a first status of the plurality of statuses associated with a first digital certificate of the plurality of digital certificates. The first digital certificate is associated with a first device. The instructions also cause the at least one processor to receive, from a first computer device, a status update for the first digital certificate. The status update includes a suspension of the first digital certificate. The instructions further cause the at least one processor to update the first status based on the status update. Subsequently to updating the first status, the instructions cause the at least one processor to receive a request for a connection from the first device. Subsequently to updating the first status, the instructions also cause the at least one processor to deny the request for a connection based on the first status.

BRIEF DESCRIPTION OF THE DRAWINGS

These and other features, aspects, and advantages of the present disclosure will become better understood when the following detailed description is read with reference to the following accompanying drawings, in which like characters represent like parts throughout the drawings.

Figure 1:
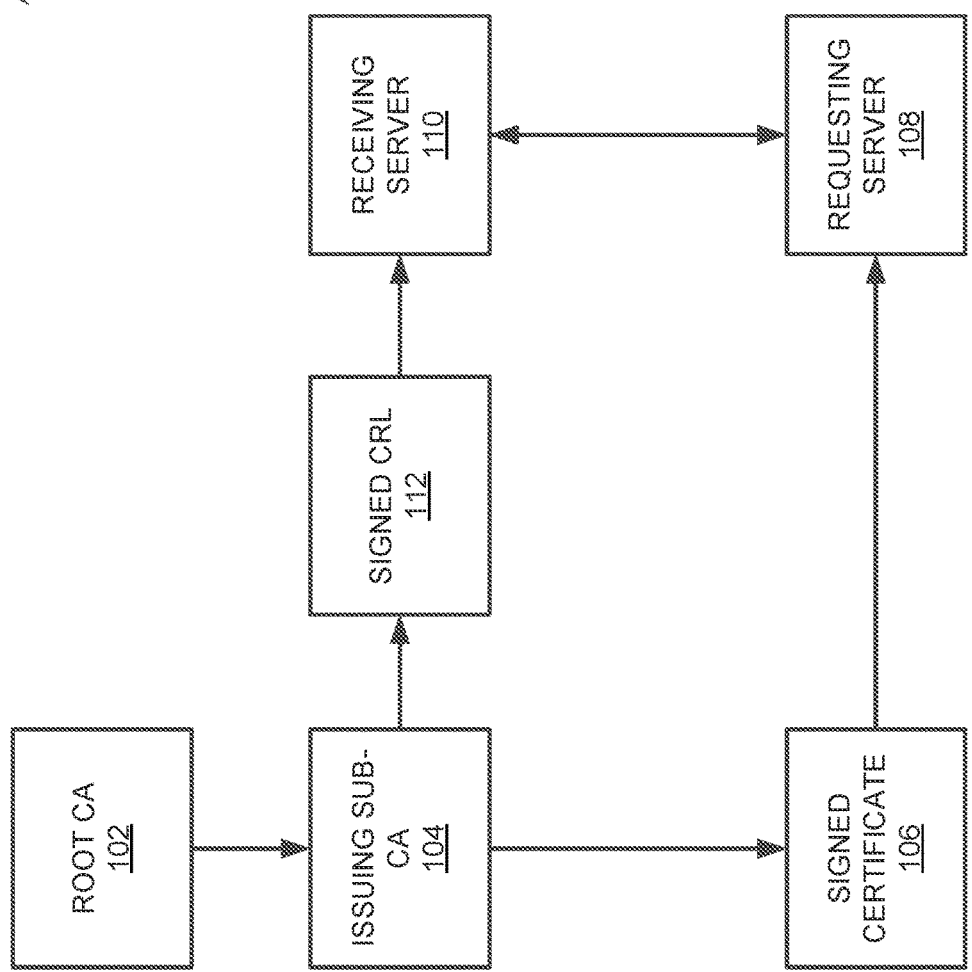
FIG. 1 is a schematic illustration of a system for performing CRL processing, in accordance with one embodiment.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program storage in memory for execution by personal computers, workstations, clients, and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

The embodiments described herein provide systems and methods for enhanced internet of things digital certificate security. More specifically, the systems and methods described herein provide automatically updating certificate revocation status using Internet of Things (IoT) cloud services.

In an exemplary embodiment, the present systems and methods utilize an X.509 trust model, in which a trusted third party CA is responsible for signing digital certificates. Accordingly, as described herein, the CA is presumed to have capability to store one or more trusted root certificates (or intermediate certificates) as well as the corresponding private keys. The CA is further responsible for maintaining up-to-date revocation information regarding the validity of issued certificates, and will provide information to the other parties, for example, through the CRL or OCSP. The OCSP Internet protocol obtains a revocation status of an X.509 digital certificate, and is generally considered an alternative to the CRL. OCSP messages may be communicated, for example, by Abstract Syntax Notation One (ASN.1) encoding over the Hypertext Transfer Protocol (HTTP), from and to OCSP responders of the CA server (or OCSP server).

In exemplary operation, IoT devices may be managed by a central online cloud service, which may include a database of certificates associated with those devices. A server of the cloud service may be configured to handle tracking the revocation status of each of the certificates and corresponding devices using built-in authentication and registration systems. In an exemplary embodiment, the cloud service server stores a plurality of certificates associated with a plurality of IoT devices. The cloud service server receives requests to connect from the IoT devices and allows the devices to connect if their corresponding certificates are valid. The cloud service server receives CRLs and lists/tags the certificates as invalid if the certificates are listed as revoked in the CRL. The cloud service server may then prevent the corresponding IoT devices from connecting.

FIG. 1 is a schematic illustration of a system 100 for performing a CRL process, in accordance with an embodiment. In an exemplary embodiment, system 100 includes a root CA 102 in communication with one or more issuing subordinate-CAs 104. In this example, the root CA 102 may represent the highest level of the CA-hierarchy, and thus serves as the trust anchor. In order for a certificate to be trusted, the certificate chains to root CA 102 to be embedded in the operating system, browser, device, or other entity that is validating the certificate. Sub-CAs 104 thus exist below root CA 102 in the CA-hierarchy, and define and authorize the types of certificates that can be requested from root CA 102. For example, there may be separate sub-CAs 104 for different locations, or there might be a first sub-CA 104 for certificates with ECC keys, and a second sub-CA 104 for certificates with RSA keys. In some embodiments, there may be a hierarchy of sub-CAs 104, with root CA 102 on top of the hierarchy, with each entity being signed by the one above it in the hierarchy to create a chain of trust.

In an exemplary embodiment, the issuing sub-CA 104 generates a signed digital certificate 106 that is installed on a requesting server 108. For example, signed certificate 106 may be associated with a website (not shown) to generate a trust level for the website. In an embodiment, requesting server 108 transmits a connection request to a receiving server 110 using certificate 106. If receiving server 110 validates that certificate 106, such as by validating the signature of certificate 106, then receiving server 110 may approve the connection request.

In the exemplary embodiment, at a subsequent point in time to the issuance of certificate 106, certificate 106 is revoked. In this case, issuing sub-CA 104 may be configured to verify the revocation and issue a signed CRL 112 that includes a revocation of signed digital certificate 106. CRL 112 may, for example, be or include a cryptographically signed list of certificates 106 that have been revoked for a variety of reasons. In some situations, CRL 112 is published on a periodic basis. In other situations, CRL 112 is published immediately after a particular certificate 106 has been revoked. In some embodiments, CRL 112 is published by a trusted authority different than the issuing authority. In at least one embodiment, CRL 112 is pushed to receiving server 110. In some instances, receiving server 110 requests CRL 112 from issuing sub-CA 104, such as when digital certificate 106 is received, or on a periodic basis, to validate certificate 106 and/or the revocation thereof.

In an exemplary embodiment, after receiving server 110 validates the signature of digital certificate 106, receiving server 110 may further check the revocation status of digital certificate 106. In this example, receiving server 110 reviews signed CRL 112 to determine if digital certificate 106 has been revoked. If certificate 106 has been revoked, even if the signature thereof has been validated, receiving server 110 may refuse the connection request from requesting server 108.

Figure 2:
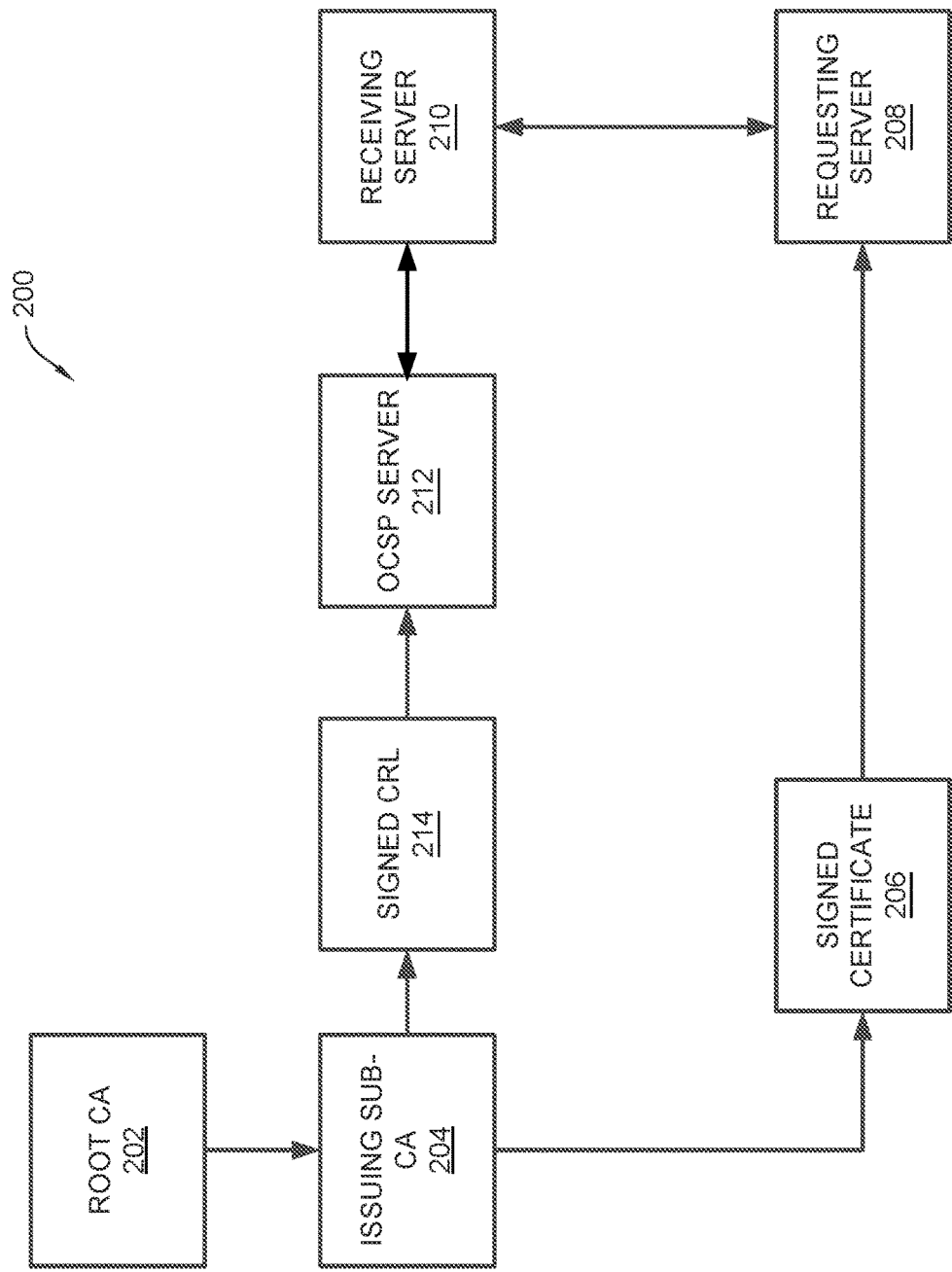
FIG. 2 is a schematic illustration of a system for performing Online Certificate Status Protocol processing, in accordance with an embodiment.

FIG. 2 is a schematic illustration of a system 200 for performing OCSP processing, in accordance with an embodiment. In an exemplary embodiment, system 200 includes a root CA 202 in communication with one or more issuing subordinate-CAs 204. In an embodiment, at least one of issuing sub-CAs 204 generates a signed digital certificate 206 that is installed on a requesting server 208. In the exemplary embodiment, requesting server 208 transmits a connection request to a receiving server 210 using certificate 206. In this example, after receiving server 210 validates the signature of digital certificate 206, receiving server 210 may check the revocation status of digital certificate 206.

In exemplary operation, receiving server 210 determines from which server information may be retrieved. In some embodiments, digital certificate 206 includes the address of an OCSP server 212 located therein. In other embodiments, receiving server 210 includes one or more locally configured options to enable receiving server 210 to request the revocation status of digital certificate 206. Receiving server 210 may then transmit a query (e.g., an OCSP request) to OCSP server 212 to determine the status of digital certificate 206. In an exemplary embodiment, OC SP server 212 includes a database of the status(es) of a plurality of digital certificates 206. OCSP server 212 may respond to the transmitted query with an OCSP response, which may include the revocation status of digital certificate 206.

In the case where digital certificate 206 is not associated with revocation information, the OCSP response may include a non-revoked status. If receiving server 210 validates digital certificate 206, such as by validating the signature of digital certificate 206 and confirming the non-revocation status thereof, then receiving server 210 may approve the connection request from requesting server 208. By using OCSP server 212 as a repository of certificates statuses, each individual server, such as receiving server 210, is not required to have to keep track of an issued CRL 214, but instead may query OCSP server 212 as a central repository. In some embodiments, issuing sub-CA 204 provides the status of digital certificate 206 to OCSP server 212. In at least one embodiment, issuing sub-CA 204 provides another status update, for digital certificate 206, to OCSP server 212 when the status of digital certificate 206 changes.

In an exemplary embodiment, at a subsequent point in time to the issuance of digital certificate 206, digital certificate 206 is revoked. In this example, issuing sub-CA 204 verifies the revocation and issues signed CRL 214, which includes a revocation of signed digital certificate 206. In an embodiment, OCSP server 212 receives signed CRL 214 and updates an internal database (not shown) regarding the certificate status information. Subsequently, when receiving server 210 receives a connection request associated with digital certificate 206, receiving server 210 may validate the signature of digital certificate 206, and then further check the revocation status thereof. In this example, receiving server 210 queries OCSP server 212 to determine if digital certificate 206 has been revoked. If digital certificate 206 has been revoked, even if the signature thereof has been validated, receiving server 210 may refuse the connection request from requesting server 208.

Figure 3:
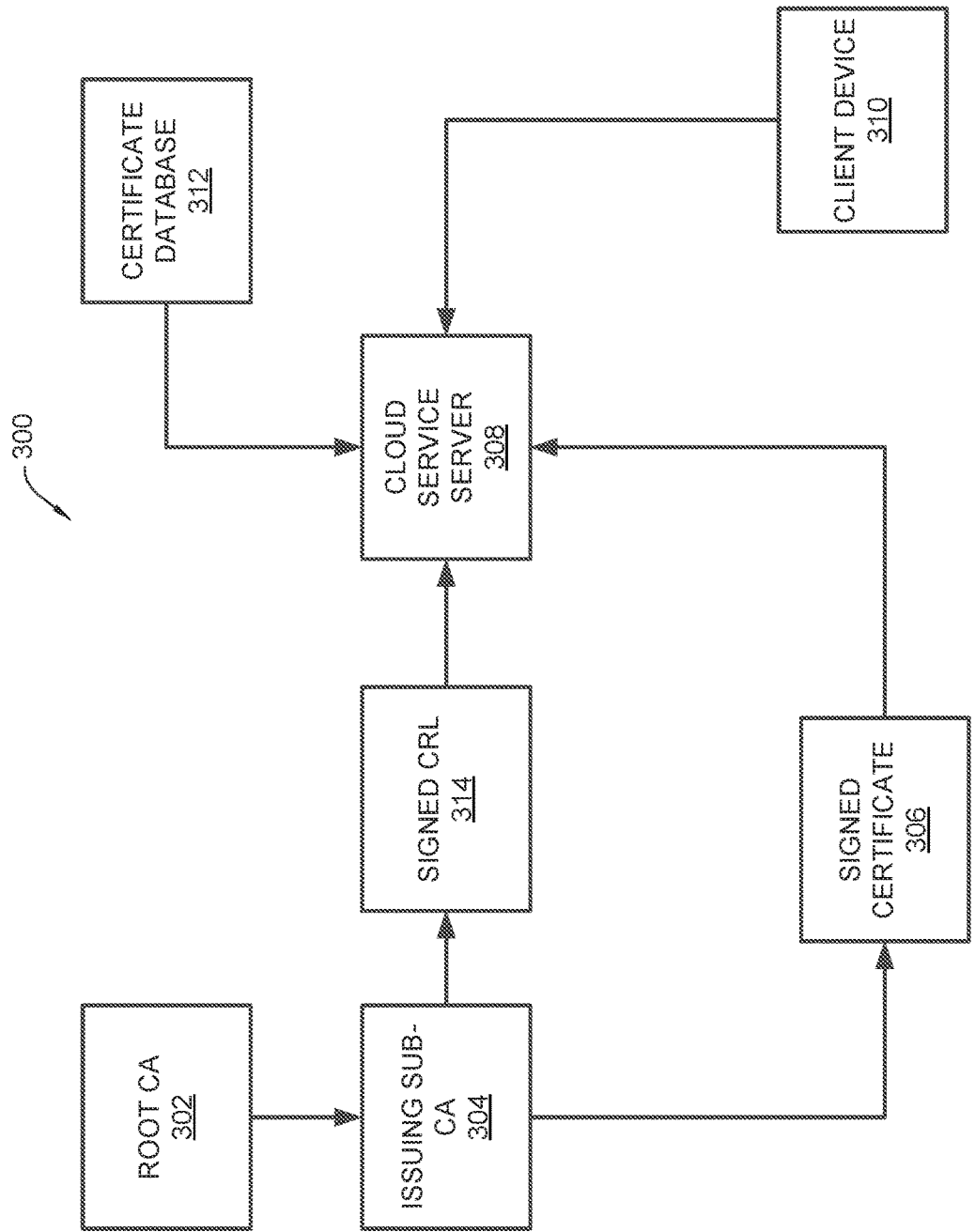
FIG. 3 is a schematic illustration of a system for performing Internet of Things cloud-based revocation processing, in accordance with an embodiment.

FIG. 3 is a schematic illustration of a system 300 for performing IoT cloud-based revocation processing. In an exemplary embodiment, system 300 includes a root CA 302 in communication with one or more issuing subordinate-CAs 304. In this embodiment, at least one issuing sub-CA 304 generates a signed digital certificate 306 that is installed on a cloud service server 308. Cloud service server 308 may, for example, be configured to manage a plurality of client devices 310 (e.g., IoT devices) that have registered with cloud service server 308.

In some embodiments, cloud service server 308 is associated with the manufacturer of devices 310. In an exemplary embodiment, IoT devices 310 are associated with certificates 306, and are pre-registered to those certificates 306 to such that efficient connection establishment and assignment of devices 310 to the respective manufacturer accounts are enabled. In some embodiments, cloud service server 308 stores certificates 306 in a certificate database 312, and database 312 may be operably connected to cloud service server 308. In other embodiments, database 312 is remote from cloud service server 308.

In exemplary operation, a particular device 310 attempts to access cloud service server 308, and cloud service server 308 checks database 312 to validate the particular certificate 306 associated with that device 310. If the validation passes, then cloud service server 308 may grant access to device 310. In this example, and at a subsequent point in time to the issuance of certificate 306, certificate 306 is revoked. Issuing sub-CA 304 may verify the revocation, and then issue a signed CRL 314 that includes a revocation of signed digital certificate 306. In the exemplary embodiment, cloud service server 308 receives signed CRL 314 and updates database 312 regarding certificate status information. In some embodiments, CRL 314 is pushed to cloud service server 308. In other embodiments, cloud service server 308 pulls CRL 314. In further embodiments, cloud service server 308 receives a Certificate Suspension List (CSL). In at least one embodiment, cloud service server 308 tags or deregisters certificate 306.

In further operation, when cloud service server 308 subsequently receives a connection request associated with digital certificate 306, cloud service server 308 checks the status of digital certificate 306 in database 312. If certificate 306 has been revoked or suspended, cloud service server 308 refuses the connection request from device 310, such that device 310 is prevented from connecting to the cloud service. In some cases, cloud service server 308 may cause device 310 to display the revocation or suspension status, such as on a browser or app.

System 300 therefore represents a further improvement over conventional systems, and particularly with respect to IoT device use cases. Systems, for example, that may be deemed workable in server and data center use cases, may become problematic in an IoT use case due to lack of scalability, as well as the limited computing resources available in many smaller IoT devices. Furthermore, many such devices are not always connected to the Internet, and then often connect through gateways and cloud services. In addition, the scale of IoT is far beyond the scale of most websites and servers. At present, approximately 2 billion IoT devices ship in the market every year, and the need for scalable authentication is driving the market towards public key infrastructure (PKI).

Moreover, many IoT devices are associated or pre-registered with certificates upon manufacture. Some of these pre-existing certificates may become compromised and revoked before the IoT devices are even first connected. Others of these certificates become compromised or revoked some time afterwards. For example, if a reel of secure elements or contained elements was lost or stolen, the revocation of tens of thousands of certificates may result from just one such incident. Accordingly, system 300 provides an innovative system architecture and techniques thereof which enable scalability for handling IoT devices, and which further reduce the time and messages necessary to validate a certificate and provide a connection.

Referring back to FIG. 3, since many IoT devices 310 may be managed by central online cloud service 308, it is much more efficient to have the revocation handled at the managing cloud service 308 using the built-in authentication and registration system of devices 310. In this example, cloud services 308 may use either a certificate or key based identity management system for tracking ownership of IoT device 310 through manufacturer accounts. System 300 thus enables more secure and more efficient management of the revocation of millions of devices, but without flooding the Internet, or other networks, with massive numbers of revocation status requests, i.e., which may now be alternatively handled within IoT cloud service 308. As such, system 300 provides massive scalability advantage over conventional techniques, while significantly simplifying deployment and management on an ongoing basis.

In some embodiments, cloud services 308 further enable greater granularity in access control. For example, instead of just having two statuses (e.g., "OK" and "revoked"), certificates 306 may further include a plurality of different access levels or tiers, which levels/tiers may be progressively accesses (or denied) depending on the particular situation and/or purpose of device 310. Such access levels/tiers may reflect additional statuses that include, but are not limited to, "suspended", "monitor", and "limited access". In an exemplary embodiment, such additional statuses are provided through other certificate lists, such as the CSL. In these examples, a suspended certificate 306 may also advantageously have its suspension reversed.

Figure 4:
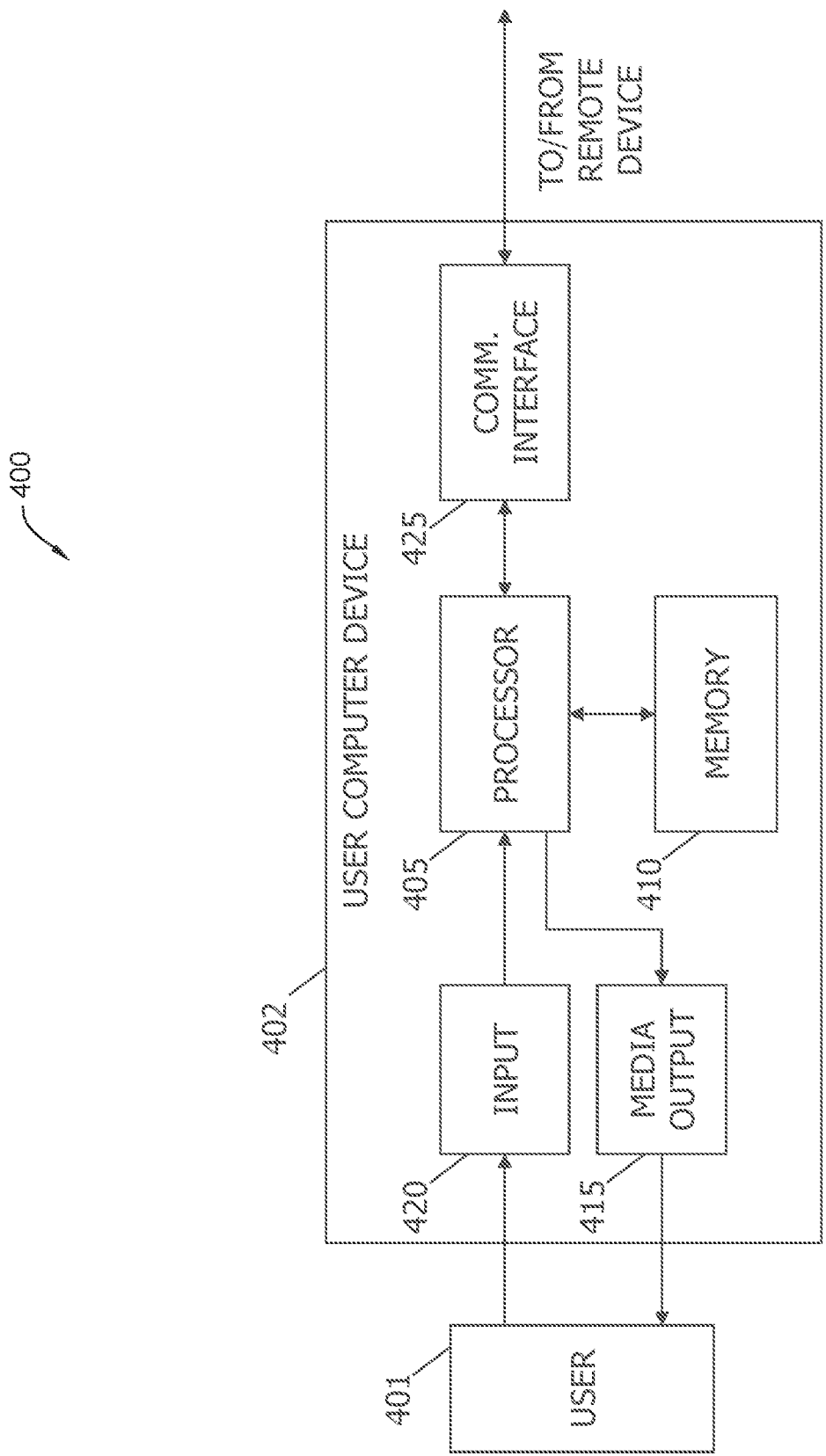
FIG. 4 illustrates an example configuration of a client system, in accordance with an embodiment of the present disclosure.

FIG. 4 illustrates an example configuration of a client system 400. In an exemplary embodiment, system 400 is similar in structure and functionality to portions of system 100, FIG. 1, and configured for operation by a user 401 operating a user computer device 402. User computer device 402 may, for example, include client device 310, FIG. 3, and a processor 405 for executing executable instructions stored in a memory area 410. Processor 405 may also include one or more processing units (e.g., in a multi-core configuration, not shown). Memory area 410 may, for example, be or include a device, unit, or module that enables information, such as executable instructions and/or transaction data, to be stored and retrieved, and may include one or more computer-readable media.

In an embodiment, user computer device 402 further includes at least one media output component 415 for presenting information to user 401. Media output component 415 may be, for example, a component or module that enables the conveyance of information to user 401. In some embodiments, media output component 415 includes an output adapter (not shown), such as a video adapter and/or an audio adapter, which is operatively coupled to processor 405 and/or to an output device, such as a display device (e.g., a cathode ray tube (CRT), liquid crystal display (LCD), light emitting diode (LED) display, or "electronic ink" display) or an audio output device (e.g., a speaker or headphones). In some embodiments, media output component 415 is configured to present a graphical user interface (e.g., a web browser and/or a client application) to user 401, including, for example, one or more settings for connecting to another device via a power cable and/or receiving authentication information.

In some embodiments, user computer device 402 also includes an input device 420 for receiving input from user 401. That is, user 401 may operate input device 420 to, without limitation, select and/or enter a setting for a network. Input device 420 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. In some cases, a single component, such as a touch screen, may function as both the output device of media output component 415 and input device 420. In at least one embodiment, input device 420 is further configured to receive authentication information from user 401, and may therefore include one or more of a keyboard or keypad, a card reader, a radio-frequency identifier (RFID) reader, a biometric scanner, and/or another device enabling identification and/or authentication of user 401 or computer device 402.

User computer device 402 may also include a communication interface 425, communicatively coupled to a remote device, such as cloud service server 308, FIG. 3. Communication interface 425 may include, for example, a wired or wireless network adapter and/or a wireless data transceiver for use with a mobile telecommunications network.

Stored in memory area 410 are, for example, computer-readable instructions for providing user interface capability to user 401 via media output component 415 and, optionally, receiving and processing input from input device 420. Such user interfaces may include, among other possibilities, a web browser and/or a client application, which enable users, such as user 401, to display and interact with cloud service server 308 directly (client application), or media and other information typically embedded on a web page or a website from cloud service server 308 (web browser). For example, instructions may be stored by a cloud service and display the output executed instructions on media output component 415.

FIG. 4 illustrates an example configuration of a client system 400. In an exemplary embodiment, system 400 is similar in structure and functionality to portions of system 100, FIG. 1, and configured for operation by a user 401 operating a user computer device 402. User computer device 402 may, for example, include client device 310, FIG. 3, and a processor 405 for executing executable instructions stored in a memory area 410.

Figure 5:
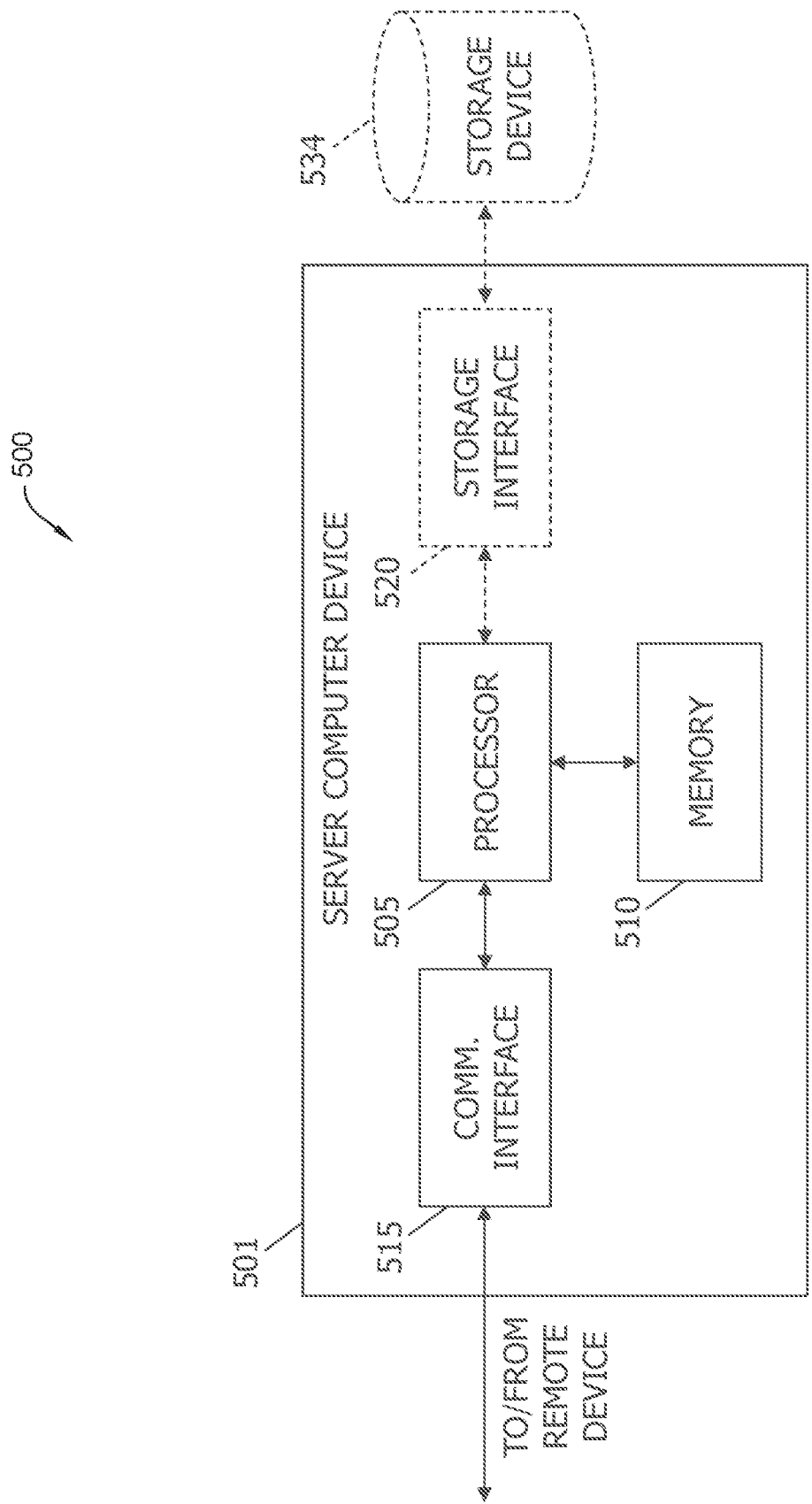
FIG. 5 illustrates an example configuration of a server system, in accordance with embodiments of the present disclosure.

FIG. 5 illustrates an example configuration of a server system 500. In an exemplary embodiment, system 500 is configured for operation by a server computer device 501, and may be similar in structure and functionality to portions of system 100, FIG. 1, system 200, FIG. 2, and system 300, FIG. 3, including without limitation root CAs 102, 202, 302, issuing sub-CAs 104, 204, 304, requesting servers 108, 208, receiving servers 110, 210, OCSP server 212, and cloud service server 308. In the exemplary embodiment, server computer device 501 further includes a processor 505 for executing executable instructions stored in a memory area 510, and may include one or more processing units (e.g., in a multi-core configuration). Processor 505 may be operatively coupled to a communication interface 515, such that server computer device 501 is capable of communicating with a remote device such as another server computer device 501 and/or client device 310, FIG. 3. For example, communication interface 515 may receive information from computer devices connected to the cloud service server 308 via the Internet.

In an embodiment, processor 505 may be further operatively coupled to a storage device 534. Storage device 534 may, for example, include computer-operated hardware suitable for storing and/or retrieving data, such as, but not limited to, data associated with a database, such as certificate database 312, FIG. 3. In some embodiments, storage device 534 is integrated in server computer device 501. For example, server computer device 501 may include one or more hard disk drives within or associated with storage device 534. In other embodiments, storage device 534 may be external to server computer device 501, and may represent a central repository accessible by server computer device 501, or by a plurality of different server computer devices 501. For example, storage device 534 may include a storage area network (SAN), a network attached storage (NAS) system, and/or multiple storage units such as hard disks and/or solid state disks in a redundant array of inexpensive disks (RAID) configuration.

In some embodiments, processor 505 is operatively coupled to storage device 534 via a storage interface 520. Storage interface 520 may, for example, be or include a hardware module or component configured to provide processor 505 with access to storage device 534. Storage interface 520 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 505 with access to storage device 534.

In exemplary operation, processor 505 executes computer-executable instructions for implementing aspects of the disclosure. In some embodiments, processor 505 is transformed into a special purpose microprocessor by execution of the computer-executable instructions, or otherwise through specialized programming according to the embodiments described herein.

Figure 6:
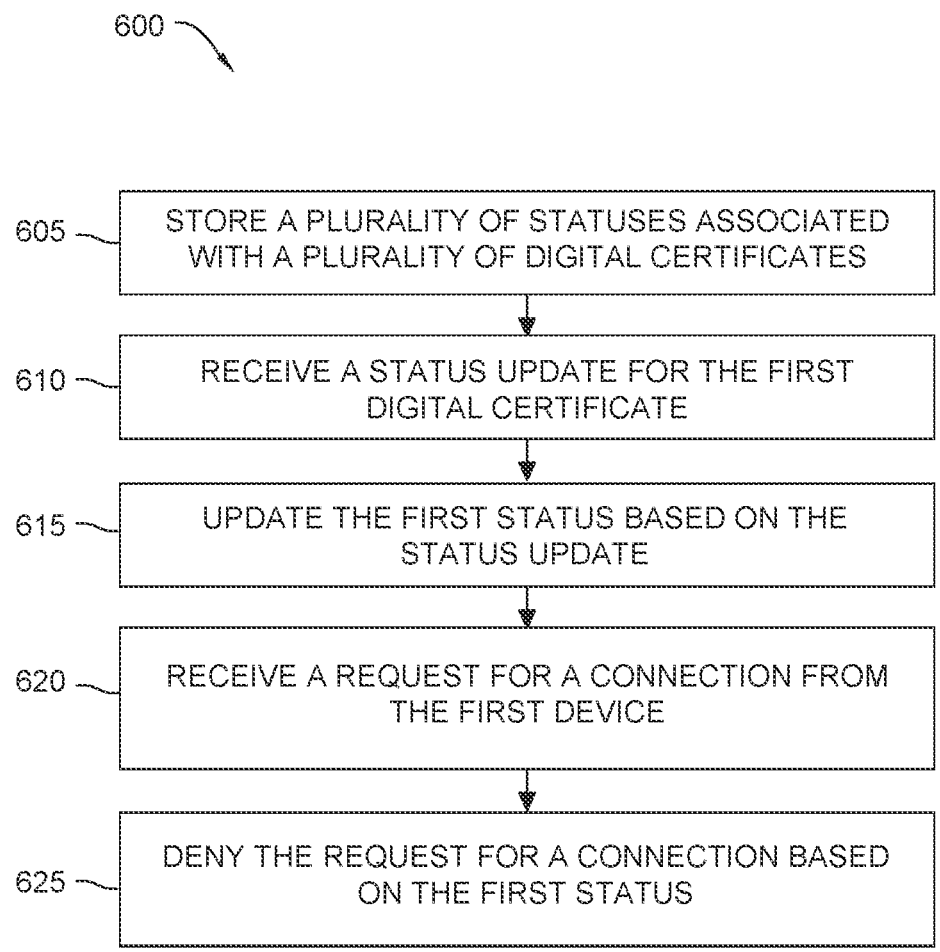
FIG. 6 is a flowchart depicting an Internet of Things cloud-based revocation process, in accordance with embodiments of the present disclosure.

FIG. 6 is a flowchart depicting an IoT cloud-based revocation process 600. In an exemplary embodiment, process 600 is performed using system 300, and implemented by a computing device, such as cloud service server 308 (both shown in FIG. 3), as well as other components of system 300. In an embodiment, process 600 may be executed as a series of steps, which may be performed in the following order, a different order, or with two or more steps being performed simultaneously.

In the exemplary embodiment, process 600 begins at step 605, in which cloud service server 308 stores a plurality of statuses associated with a plurality of digital certificates (e.g., signed certificate 306). In an exemplary embodiment of step 605, cloud service server 308 stores the plurality of statuses and the plurality of digital certificates in a database (e.g., certificate database 312). The plurality of statuses may include a first status of the plurality of statuses associated with a first digital certificate associated with a first device (e.g., client device 310). The statuses may further include at least one of a "valid", "revoked", "suspended", "monitor", and "limited access" designation.

In step 610, cloud service server 308 receives a status update for the first digital certificate, which may include at least one of a revocation and a suspension of the first digital certificate. In an exemplary embodiment of step 610, the status update further includes one or more of a revocation of the first digital certificate, a suspension of the first digital certificate, a removal of the certificate suspension, a "monitor" designation, and a "limited access" designation. In some embodiments of step 610, cloud service server 308 receives the status update from a first computer device (e.g., issuing sub-CA 304). In at least one embodiment of step 610, the status update is a signed CRL (e.g., CRL 314).

In step 615, the cloud service server updates the first status based on the status update. In an exemplary embodiment of step 615, the cloud service server stores the updated first status in the database. In embodiments where the status update is the signed CRL, the cloud service server compares the CRL to the plurality of digital certificates. In at least one embodiment of step 615, when the cloud service server detects a match of the first digital certificate based on the comparison, the cloud service server updates the first status to be revoked based on detecting the match. In step 620, subsequent to updating the first status, the cloud service server receives a request for a connection from the first device. In step 625, and also subsequent to updating the first status, the cloud service server denies the request for a connection based on the first status.

In some embodiments of process 600, cloud service server 308 may query database 312 to retrieve the first status of first digital certificate 306(1) associated with first device 310(1). In this example, cloud service server 308 may determine that first digital certificate 306(1) is currently invalid based on the first status. Cloud service server 308 may then generate a response message based on the first status, and transmit a response message to first device 310(1). In an exemplary embodiment, the response message may cause, or result in, status information associated with the first status to be displayed on first device 310(1).

In some embodiments, the status update includes suspension of the first certificate and the first status, indicating that first certificate 306(1) is suspended. In this example, cloud service server 308 may receive a second status update, for first digital certificate 306(1), including a suspension removal for first digital certificate 306(1). Cloud service server 308 may then update the first status based on the status update. Subsequently to updating the first status, cloud service server 308 receives a second request for a connection from first device 310(1). Accordingly, and also subsequently to updating the first status, cloud service server 308 may then allow the second request for a connection based on the first status.

In some embodiments, a second status of the plurality of statuses is associated with a second digital certificate 306(2) of the plurality of digital certificates 306. In this example, second digital certificate 306(2) is associated with a second device 310(2), and cloud service server 308 receives a request for a connection from second device 310(2). Upon receiving this request, cloud service server 308 may determine a current status of second digital certificate 306(2) based on the second status, and then allow the request for a connection based on the current status of second digital certificate 306(2).

In an embodiment, cloud service server 308 may store, in database 312, a plurality of statuses associated with a plurality of digital certificates 306. This plurality of statuses may include a first status of the plurality of statuses associated with first digital certificate 306(1) associated with first device 310(1). In this example, cloud service server 308 receives a status update, for first digital certificate 306(1), including a suspension of first digital certificate 306(1). Cloud service server 308 may then update the first status based on the status update, and then subsequently receives a request for a connection from first device 310(1). Cloud service server 308 may then deny this subsequent request for a connection based on the first status.

Further to this example, cloud service server 308 may receive a second status update, for first digital certificate 306(1), including a suspension removal for first digital certificate 306(1). In this case, cloud service server 308 may updates the first status based on the status update, and subsequently receives a second request for a connection from first device 310(1). Cloud service server 308 may then allow this second request for a connection based on the first status.

The computer-implemented methods discussed herein may include additional, fewer, or alternate actions, including those discussed elsewhere herein. The methods may be implemented via one or more local or remote processors, transceivers, and/or sensors (such as processors, transceivers, and/or sensors mounted on vehicles or mobile devices, or associated with smart infrastructure or remote servers), and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

The exemplary embodiments provided herein describe a messaging system for requesting and receiving the revocation status of digital certificates, that is advantageously disposed within one or more of the computer device, the certificate authority, and a network of one or more responder servers, to track and report on the revocation status of digital certificates. The messaging system thus functions as a verification system capable of: (i) reporting on the status of a target digital certificate to ensure trust between devices; (ii) simplify the requirements for deploying revocation infrastructures; (iii) reducing the number of bits on the wire by limiting the number of revocation status checks; (iv) lowering the deployment costs of revocation infrastructures by centralizing the storage of statuses at a centralized location; and (v) connecting the revocation status of digital certificates to existing cloud based services for IoT devices.

The aspects described herein may be implemented as part of one or more computer components such as a client device and/or one or more back-end components, such as a cloud service server, for example. Furthermore, the aspects described herein may be implemented as part of computer network architecture and/or a cognitive computing architecture that facilitates communications between various other devices and/or components. Thus, the aspects described herein address and solve issues of a technical nature that are necessarily rooted in computer technology.

For instance, aspects include analyzing the current status of digital certificates to determine the status of those certificates to allow trust to be built between devices to improve security. Furthermore, these aspects reduce the chance of data compromise and allow for proposer access to computer systems. Without the improvements suggested herein, additional processing and memory usage would be required to perform such activities. Additional technical advantages include, but are not limited to: (i) improved speed and responsiveness in communication with a connected device; (ii) reduced message traffic; (iii) ensuring that the revocation status of certificates is properly reported; (iv) reducing the potential for out-of-date information; (v) reducing the chance for confusion with regards to revocation status; and (vi) allow for constantly up-to-date information about the revocation state of digital certificates. Additional technical advantages are described in other sections of the specification.

The improvements described herein may be achieved by performing one or more of the following steps: (a) storing, in a database, a plurality of statuses associated with a plurality of digital certificates, including a first status of the plurality of statuses associated with a first digital certificate of the plurality of digital certificates, and wherein the first digital certificate is associated with a first device; (b) receiving, from a first computer device, a status update for the first digital certificate, wherein the status update further includes at least one of a revocation of the first digital certificate, a suspension of the first digital certificate, remove the suspension, monitor, and limited access; (c) updating the first status based on the status update; (d) subsequently to updating the first status, receiving a request for a connection from the first device; (e) subsequently to updating the first status, denying the request for a connection based on the first status; (f) querying the database to retrieve the first status of the first digital certificate associated with the first device; (g) determining that the first digital certificate is currently invalid based on the first status; (h) generating a response message based on the first status; (i) transmitting a response message to the first device, wherein the response message causes status information associated with the first status to be displayed on the first device; (j) receiving a second status update for the first digital certificate, wherein the second status update includes a suspension removal for the first digital certificate; (k) updating the first status based on the status update; (l) subsequently to updating the first status, receiving a second request for a connection from the first device; (m) subsequently to updating the first status, allowing the second request for a connection based on the first status; (o) receiving a request for a connection from the second device, wherein a second status of the plurality of statuses is associated with a second digital certificate of the plurality of digital certificates, wherein the second digital certificate is associated with a second device; (p) determining a current status of the second digital certificate based on the second status; (q) allowing the request for a connection based on the current status of the second digital certificate; (r) receiving, from the first computer device, a copy of a certificate revocation list; (s) comparing the certificate revocation list to the plurality of digital certificates; (t) detecting a match of the first digital certificate based on the comparison; (u) updating the first status to revoked based on detecting the match; and/or (v) transmitting a request for the copy of the certificate revocation list.

The improvements described herein may also be achieved by performing one or more of the following steps: (a) storing, in a database, a plurality of statuses associated with a plurality of digital certificates, including a first status of the plurality of statuses associated with a first digital certificate of the plurality of digital certificates, and wherein the first digital certificate is associated with a first device; (b) receiving, from a first computer device, a status update for the first digital certificate, wherein the status update includes a suspension of the first digital certificate; (c) updating the first status based on the status update; (d) subsequently to updating the first status, receive a request for a connection from the first device; (e) subsequently to updating the first status, denying the request for a connection based on the first status; (f) receiving a second status update for the first digital certificate, wherein the second status update includes a suspension removal for the first digital certificate; (g) updating the first status based on the status update; (h) subsequently to updating the first status, receiving a second request for a connection from the first device; and (i) subsequently to updating the first status, allowing the second request for a connection based on the first status.

Furthermore, the embodiments described herein improve upon existing technologies, and improve the functionality of computers, by more accurately predict or identify the current status of digital certificates. The present embodiments improve the speed, efficiency, and accuracy in which such calculations and processor analysis may be performed. Due to these improvements, the aspects address computer-related issues regarding efficiency over conventional techniques. Thus, the aspects also address computer related issues that are related to computer security, for example.

Accordingly, the innovative systems and methods described herein are of particular value within the realm of secure Internet communications. The present embodiments enable more reliable updating and monitoring of such communications, but without compromising data and speed. Furthermore, according to the disclosed techniques, user computer device are better able to monitor and determine the security of websites and other connected devices, and thereby protecting computer devices from malicious actors.

Exemplary embodiments of systems and methods for determining revocation statuses of digital certificates are described above in detail. The systems and methods of this disclosure though, are not limited to only the specific embodiments described herein, but rather, the components and/or steps of their implementation may be utilized independently and separately from other components and/or steps described herein.

Although specific features of various embodiments may be shown in some drawings and not in others, this is for convenience only. In accordance with the principles of the systems and methods described herein, any feature of a drawing may be referenced or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a programmable logic unit (PLU), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for enhanced internet of things (IoT) digital certificate security, comprising:
   a computer device including at least one processor; and
   a memory device in communication with the at least one processor and configured to store a plurality of computer-executable instructions, which, when executed by the at least one processor, cause the at least one processor to:
   store, in a database, a plurality of statuses associated with a plurality of digital certificates, including a first status of the plurality of statuses associated with a first digital certificate of the plurality of digital certificates and a second status of the plurality of statuses is associated with a second digital certificate of the plurality of digital certificates, and wherein the first digital certificate is associated with a first device and the second digital certificate is associated with a second device;
   receive, from a first computer device, a status update for the first digital certificate, wherein the status update includes at least one of a revocation and a suspension of the first digital certificate;
   update the first status based on the status update;
   subsequently to updating the first status, receive a request for a connection from the first device;
   subsequently to updating the first status, deny the request for a connection based on the first status;
   receive a request for a connection from the second device;
   determine a current status of the second digital certificate based on the second status; and
   allow the request for a connection based on the current status of the second digital certificate.

2. The system in accordance with claim 1, wherein the instructions further cause the at least one processor to:
   query the database to retrieve the first status of the first digital certificate associated with the first device; and
   determine that the first digital certificate is currently invalid based on the first status.

3. The system in accordance with claim 2, wherein the instructions further cause the at least one processor to:
   generate a response message based on the first status; and
   transmit a response message to the first device,
   wherein the response message causes status information associated with the first status to be displayed on the first device.

4. The system in accordance with claim 1, wherein the status update further includes at least one of a revocation of the first digital certificate, a suspension of the first digital certificate, remove the suspension, monitor, and limited access.

5. The system in accordance with claim 1, wherein the status update included suspension of the first certificate, and wherein the instructions further cause the at least one processor to:
   receive a second status update for the first digital certificate, wherein the second status update includes a suspension removal for the first digital certificate;
   update the first status based on the status update;
   subsequently to updating the first status, receive a second request for a connection from the first device; and
   subsequently to updating the first status, allow the second request for a connection based on the first status.

6. The system in accordance with claim 1, wherein the instructions further cause the at least one processor to:
   receive, from the first computer device, a copy of a certificate revocation list;
   compare the certificate revocation list to the plurality of digital certificates;
   detect a match of the first digital certificate based on the comparison; and
   update the first status to revoked based on detecting the match.

7. The system in accordance with claim 6, wherein the instructions further cause the at least one processor to transmit a request for the copy of the certificate revocation list.

8. The system in accordance with claim 1, wherein the plurality of digital certificates are pre-registered with the plurality of devices.

9. The system in accordance with claim 1, wherein the status update further includes at least one of a revocation of the first digital certificate, a suspension of the first digital certificate, remove the suspension, monitor, and limited access.

10. A method for enhanced internet of things (IoT) digital certificate security, comprising the steps of:
    storing, in a database, a plurality of statuses associated with a plurality of digital certificates, including a first status of the plurality of statuses associated with a first digital certificate of the plurality of digital certificates and a second status of the plurality of statuses is associated with a second digital certificate of the plurality of digital certificates, and wherein the first digital certificate is associated with a first device and the second digital certificate is associated with a second device;
    receiving, from a first computer device, a status update for the first digital certificate, wherein the status update includes at least one of a revocation and a suspension of the first digital certificate;
    updating the first status based on the status update;
    subsequently to updating the first status, receiving a request for a connection from the first device;
    subsequently to updating the first status, denying the request for a connection based on the first status;
    receiving a request for a connection from the second device;
    determining a current status of the second digital certificate based on the second status; and
    allowing the request for a connection based on the current status of the second digital certificate.

11. The method in accordance with claim 10, further comprising steps of:
    querying the database to retrieve the first status of the first digital certificate associated with the first device; and
    determining that the first digital certificate is currently invalid based on the first status.

12. The method in accordance with claim 11, further comprising steps of:
    generating a response message based on the first status; and
    transmitting a response message to the first device, wherein the response message causes status information associated with the first status to be displayed on the first device.

13. The method in accordance with claim 10, wherein the status update further includes an indication of at least one of a revocation of the first digital certificate, a suspension of the first digital certificate, a removal of the suspension, a monitoring, and a limited access.

14. The method in accordance with claim 10, further comprising steps of:
receiving a second status update for the first digital certificate, wherein the second status update includes a suspension removal for the first digital certificate;
updating the first status based on the status update;
subsequently to updating the first status, receiving a second request for a connection from the first device; and
subsequently to updating the first status, allowing the second request for a connection based on the first status.

15. The method in accordance with claim 10, further comprising steps of:
receiving, from the first computer device, a copy of a certificate revocation list;
comparing the certificate revocation list to the plurality of digital certificates;
detecting a match of the first digital certificate based on the comparison; and
updating the first status to revoked based on detecting the match.

16. The method in accordance with claim 15, further comprising a step of transmitting a request for the copy of the certificate revocation list.

17. The method in accordance with claim 10, wherein the plurality of digital certificates is pre-registered with the plurality of devices.

18. A system for enhanced internet of things digital certificate security, comprising:
a computer device including at least one processor; and
a memory device in communication with the at least one processor and configured to store a plurality of computer-executable instructions, which, when executed by the at least one processor, cause the at least one processor to:
store, in a database, a plurality of statuses associated with a plurality of digital certificates, including a first status of the plurality of statuses associated with a first digital certificate of the plurality of digital certificates and a second status of the plurality of statuses is associated with a second digital certificate of the plurality of digital certificates, and wherein the first digital certificate is associated with a first device and the second digital certificate is associated with a second device;
receive, from a first computer device, a status update for the first digital certificate, wherein the status update includes a suspension of the first digital certificate;
update the first status based on the status update;
subsequently to updating the first status, receive a request for a connection from the first device;
subsequently to updating the first status, deny the request for a connection based on the first status;
receive a request for a connection from the second device;
determine a current status of the second digital certificate based on the second status; and
allow the request for a connection based on the current status of the second digital certificate.

19. The system in accordance with claim 18, wherein the instructions further cause the at least one processor to:
receive a second status update for the first digital certificate, wherein the second status update includes a suspension removal for the first digital certificate;
update the first status based on the status update;
subsequently to updating the first status, receive a second request for a connection from the first device; and
subsequently to updating the first status, allow the second request for a connection based on the first status.

20. The system in accordance with claim 18, wherein the instructions further cause the at least one processor to:
query the database to retrieve the first status of the first digital certificate associated with the first device;
determine that the first digital certificate is currently invalid based on the first status;
generate a response message based on the first status; and
transmit a response message to the first device,
wherein the response message causes status information associated with the first status to be displayed on the first device.

* * * * *